United States Patent [19]

Kawato et al.

[11] Patent Number: 4,990,838
[45] Date of Patent: Feb. 5, 1991

[54] MOVEMENT TRAJECTORY GENERATING METHOD OF A DYNAMICAL SYSTEM

[75] Inventors: Mitsuo Kawato, Kyoto; Yoshiharu Maeda, Shizuoka; Yoji Uno; Ryoji Suzuki, both of Tokyo, all of Japan

[73] Assignee: ATR Auditory and Visual Perception Research Laboratories, Kyoto, Japan

[21] Appl. No.: 462,531

[22] Filed: Jan. 3, 1990

[30] Foreign Application Priority Data

Jan. 5, 1989 [JP] Japan .................................. 64-768

[51] Int. Cl.$^5$ .............................................. G06F 15/20
[52] U.S. Cl. ............................ 318/568.10; 318/568.13; 318/573; 364/513; 364/571.05; 901/15
[58] Field of Search ............................... 318/560–640; 364/513, 474.09, 474.12, 474.18, 474.19, 474.30, 474.31, 413.02, 571.05; 901/3, 9, 12, 18, 19, 20, 21, 22, 23

[56] References Cited

U.S. PATENT DOCUMENTS

| | | | |
|---|---|---|---|
| 3,950,733 | 4/1976 | Cooper et al. | 364/513 X |
| 4,796,199 | 1/1989 | Hammerstrom et al. | 364/513 |
| 4,852,018 | 7/1989 | Grossberg et al. | 364/413.02 X |
| 4,860,215 | 8/1989 | Seraji | 901/15 X |
| 4,884,216 | 11/1989 | Kuperstein | 364/571.05 X |
| 4,897,811 | 1/1990 | Scofield | 364/513 X |

Primary Examiner—William M. Shoop, Jr.
Assistant Examiner—Paul Ip
Attorney, Agent, or Firm—Lowe, Price, LeBlanc, Becker & Shur

[57] ABSTRACT

A movement trajectory generating system of a dynamical system uses neural network units (1, 2, 3) including cascade connection of a first layer (11, 21, 31), a second layer (12, 22, 32), a third layer (13, 23, 33) and a fourth layer (14, 24, 34), to learn a vector field of differential equations indicating forward dynamics of a controlled object (4). Conditions concerning trajectories of a final point and a via-point of movement of the controlled object and locations of obstacles are given from a motor center (5). While smoothness of movement is ensured by couplings of electric synapses using errors with respect to those conditions as total energy, least dissipation of energy is attained, whereby trajectory formation and control input for realizing the trajectory are obtained simultaneously.

12 Claims, 11 Drawing Sheets

FIG. 4D
0th Ite

5000th Ite

5000th Ite

MOVEMENT TRAJECTORY GENERATING METHOD OF A DYNAMICAL SYSTEM

BACKGROUND OF THE INVENTION

1. Field of the Invention

The present invention relates to a movement trajectory generating method of a dynamical system. More specifically, the present invention relates to a movement trajectory generating method of a dynamical system, which is capable of automatically generating, by least dissipation of energy, an objective trajectory of a dynamical system having nonlinear characteristics such as robots, power generation plants, motor engines, elevators, trains, cars and other vehicles, and which makes it possible to speech synthesis or to recognize continuous speech.

2. Description of the Background Art

Conventionally, teaching of a trajectory of an articulated industrial manipulator or the like is determined by a human operator in an on-line manner in a manufacturing line of a factory. However, since the manufacturing line is in operation during the daytime, teaching can be conducted only at night or on holidays. In addition, such conventional teaching method has difficulties in view of limited resources such as lack of skilled workers. Therefore, off-line trajectory generating techniques are desired. Although such off-line trajectory generating techniques are still under study, several computing geometrical methods have been proposed as solutions of problems for defining a trajectory in a minimum course while avoiding obstacles in a three-dimensional space by taking no account of the dynamics of the controlled object.

However, according to such methods, the calculation time is exponentially increased when the degrees of freedom of the controlled object and the number of obstacles are increased, and therefore such methods are not practical. In addition, since the dynamics of the controlled object is not taken into account in such methods, smooth movement cannot be obtained and excessive load is applied to the controlled object.

On the other hand, conventional optimum control methods for obtaining the optimum trajectory by setting a certain evaluation function taking account of the dynamics, strict modeling of a controlled object is indispensable for numerical calculation.

However, it is practically impossible to obtain strict modeling due to interference between articulations of a dynamical system such as an articulated industrial manipulator or due to nonlinearity of motors or speed reducing mechanisms. Thus, systematic methods for automatically forming a trajectory of a nonlinear controlled object moving smoothly and avoiding a large number of obstacles are not proposed in the prior art.

SUMMARY OF THE INVENTION

Therefore, a principal object of the present invention is to provide a movement trajectory generating method of a dynamical system, which does not require strict modeling of a nonlinear controlled object and which is capable of automatically generating a smooth trajectory as in movement of human hands without increasing calculation time exponentially even if the number of degrees of freedom of the controlled object or the number of obstacles is increased.

Briefly stated, in order to automatically generate a time trajectory of a dynamical system, the present invention uses not only various conditions for estimating a movement trajectory, such as the movement time, the start point, the end point, the via-point of the trajectory, or obstacles to the movement, but also uses a criterion for ensuring smoothness the movement trajectory by minimizing functions of evaluation in integration for the movement time equivalent to the square of a jerk, integration for the movement time equivalent to the square of rate of change of torque, and integration for the movement time equivalent to the square of rate of change of force, whereby the movement trajectory is formed.

Therefore, according to the present invention, it can be expected to make trajectory running and forming systems have improvements in performance, in which the calculation time increases only in a linear order of degrees of freedom of a control object, a trajectory is generated with high precision and in a wide range of applications, strict modeling of the controlled object or estimations of parameters are not required, and the automatic formation of the trajectory is smooth as in movements of a human, causing no excessive load to the controlled object.

According to a preferred embodiment of the present invention, a movement trajectory is formed by a large number of cascade connections of internal models each obtained by multiplying, by a unit of time, a vector field of a nonlinear differential equation describing dynamical characteristics of a controlled object, and by using a bypass corresponding to a flow of the differential equations and discrete diffusion couplings for satisfying the criterion of evaluation of movement smoothness.

According to a further preferred embodiment of the present invention, a movement trajectory is formed by an ultra multilayer neural network including a large number of cascade connections of multilayer neural networks in which internal models obtained by multiplying vector fields of nonlinear differential equations by a unit of time are learned in the multilayer neural networks, and further including bypasses corresponding to a flow of the differential equations and electric synapses for satisfying the criterion of evaluation of movement smoothness.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows the initial condition of the neural network model, and FIG. 5 shows the stable equilibrium state of the network after 1,000 iterations and the corresponding realized trajectory by the model manipulator.

DESCRIPTION OF THE PREFERRED EMBODIMENTS

Figure 1:
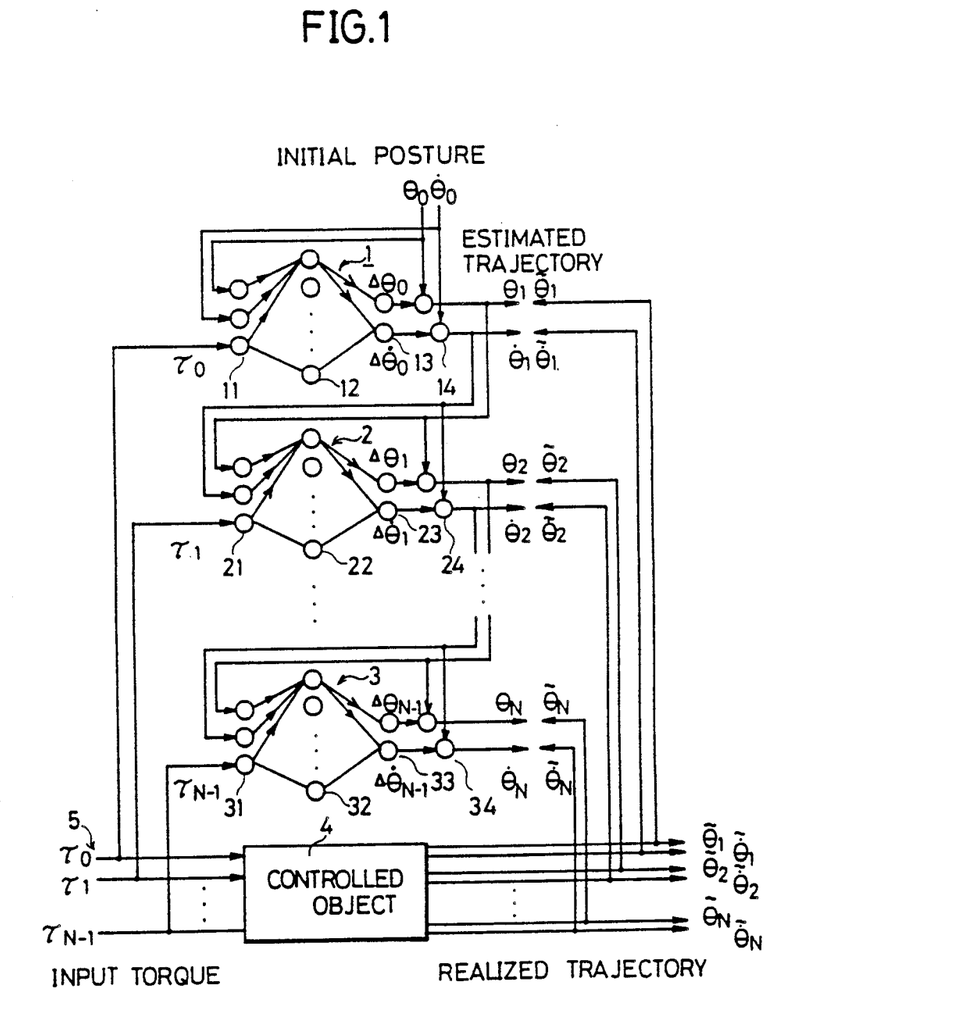
FIG. 1 is a block diagram showing learning in an embodiment of the present invention.
Figure 2:
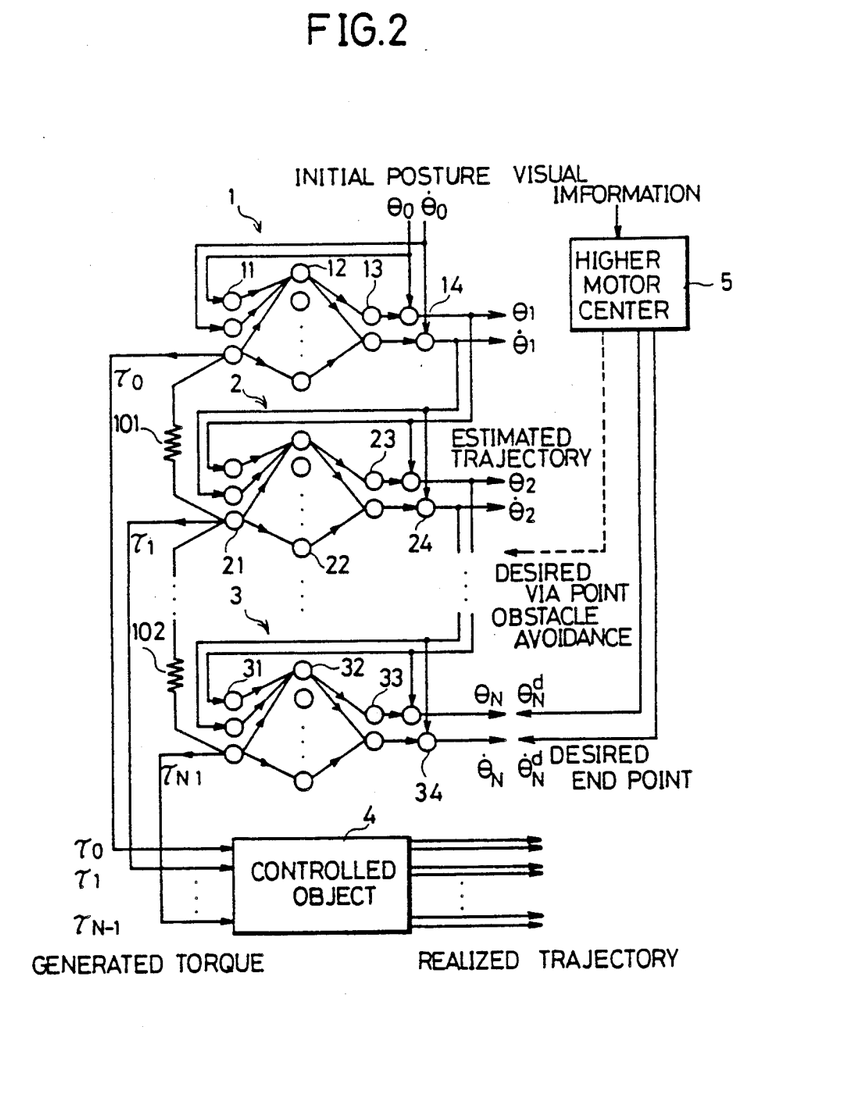
FIG. 2 is a block diagram in which a trajectory is being generated according to the embodiment of the invention.

FIGS. 1 and 2 are block diagrams showing a model according to a method of an embodiment of the present invention. Particularly, FIG. 1 shows a block diagram of learning and FIG. 2 shows a block diagram of trajectory formation.

Referring to FIGS. 1 and 2, let us assume that a controlled object 4 is described by the following equations.

$$d\theta/dt = \dot{\theta} \quad (1)$$

$$d\dot{\theta}/dt = h(\theta, \dot{\theta}, \tau), \quad (2)$$

where $\theta$, $\dot{\theta}$, $\tau$ are all scalars, and h is a scalar function. The Euler's method of numerical integration of this dynamical equation can be written as follows.

$$\theta((j+1)\Delta t) = \theta(j\Delta t) + \Delta t \cdot \dot{\theta}(j\Delta t) \quad (3)$$

$$\dot{\theta}((j+1)\Delta t) = \dot{\theta}(j\Delta t) + \Delta t \cdot h(\theta(j\Delta t), \dot{\theta}(j\Delta t), \tau(j\Delta t)). \quad (4)$$

The cascade structure of the neural network model shown in FIG. 1 is simply a direct hardware implementation of Euler's method above.

In FIG. 1, for simplicity, a single degree of freedom case without the kinematics problem is shown. All four-layer network units are identical. Operations of the model are divided into the learning phase shown in FIG. 1, and the pattern generating phase shown in FIG. 2. In the learning phase, the network unit learns the vector field of the dynamical equation which describes the forward dynamics of the controlled object 4 such as a manipulator. In the pattern generating phase, the network relaxes its state to minimum energy equilibrium based on backward propagation of errors through the acquired forward model.

The model includes many identical four-layer network units 1, 2, 3. The jth network unit corresponds to time $j\Delta t$. The network units 1, 2, 3 are connected in a cascade formation. Operation of each neuron is assumed to be the linear weighted summation of synaptic inputs and the sigmoid nonlinear transformation. The input-output transformation of the neurons in the first and fourth layers is assumed linear. Let $u_{m,j}^i$ and $y_{m,j}^i$ denote an average membrane potential (i.e. weighted summation of all synaptic inputs) and an output (i.e. average firing frequency) of the ith neuron in the mth layer of the jth network unit. $\phi$ is the input-output transformation. $w_{k,i}^{m-1,m}$ denotes a synaptic weight from the kth neuron in the m−1th layer to the ith neuron in the mth layer. Then the following equations hold:

$$u_{m,j}^i = \sum_k w_{k,i}^{m-1,m} y_{m-1,j}^k \quad (5)$$

$$y_{m,j}^i = \phi(u_{m,j}^i). \quad (6)$$

The cascade structure is formed by a unit-weight serial connection from the fourth layer of the jth network unit to the first layer of the j+1th network unit, and a unit-weight connection bypass from the fourth layer of the jth network unit to the fourth layer of the j+1th network unit:

$$y_{1,j+1}^i = y_{4,j}^i \quad (7)$$

$$y_{4,j+1}^i = y_{4,j}^i + y_{3,j+1}^i. \quad (8)$$

The serial connections correspond to the second terms of the right sides of Euler's formula. The bypass connections correspond to the first terms of the right sides, and just convey the previous states to the next time step. Actually the equation (8) corresponds to the equations (3) and (4). Since the vector field is time invariant, all the network units are identical. That is, the number of neurons and the synaptic weights are exactly the same for all units.

The network unit consists of four layers of neurons. The first layer 11, 21, 31 represents the time course of the trajectory and the torque. The third layer 13, 23, 33 represents the change of the trajectory within a unit of time, that is, the vector field multiplied by the unit of time, $\Delta t \cdot h(\theta(j\Delta t), \dot{\theta}(j\Delta t), \tau(j\Delta t))$. The second layer 12, 22, 32 provides the necessary nonlinear transformations for learning the vector filed multiplied by the unit of time. The fourth layer 14, 24, 34 and the output line on the right side represent the estimated time course of the trajectory. The fourth layer neurons in the jth unit output the estimated trajectory, $\theta(j\Delta t)$ and $\dot{\theta}(j\Delta t)$ at time $j\Delta t$, which are the summation of their synaptic inputs, i.e., the outputs of the third layer in the jth unit and outputs from the fourth layer neurons in the (j−1)st unit (see the equation (8)). The first two neurons in the first layer of the first unit represent the initial conditions $\theta(0)$ and $\dot{\theta}(0)$. Because the model faithfully reproduces the time structure of the dynamical system, intrinsic properties of the flow of the dynamical system, to be described below, are embedded into the cascade structure of the model. The intrinsic properties of the flow are (i) continuity of the solution of the dynamical system with respect to time and initial conditions, (ii) group property of the flow $\psi: \psi(t+s; x) = \psi(t; \psi(s; x))$, (iii) causality: trajectory at a given time does not depend on the torque input after that time.

In the neural network model shown in FIG. 1, those properties of the flow of the dynamical system are embedded into the structure. In the learning phase shown in FIG. 1, the common input torque are fed to both the controlled object 4 and the neural network model. The realized trajectory $(\tilde{\theta}, \tilde{\dot{\theta}})$ from the controlled object 4 is used as a teaching signal to acquire the forward dynamics model between the first and third layers 11, 21, 31 and 13, 23, 33 of the network unit. The steepest descent method is introduced for learning synaptic rates in the network unit, with the following error function E for the output of the fourth layer 14, 24, 34, $$E = \frac{1}{2} \sum_c \sum_{j=1}^{N} [\{\tilde{\theta}_c(j\Delta t) - \theta_c(j\Delta t)\}^2 + \{\tilde{\dot{\theta}}_c(j\Delta t) - \dot{\theta}_c(j\Delta t)\}^2]. \quad (9)$$

where c represents the input torque and the resulting trajectory. The back-propagation learning algorithm (Rumelhart, Hinton, & Williams, 1986; Werbos, 1988) can be applied to this case as follows. Let $\delta_{m,j}^i$ denote an error signal of the ith neuron in the mth layer of the jth network unit. Then, $\delta_{m,j}^i = -\gamma E/\gamma u_{m,j}^i$. The error signal $\delta_{4,j}^i$ of the ith neuron i in the 4th layer of the jth network unit is the summation of the error signal of the ith neuron in the 4th layer of the (j+1)st network unit and the error signal of the ith neuron in the 1st layer of the (j+1)st network unit:

$$\delta_{4,j}^i = \sum_c \{\bar{\theta}_c^i(j\Delta t) - \theta_c^i(j\Delta t)\} + \tag{10}$$

$$\delta_{4,j+1}^i + \delta_{1,j+1}^i, j = 1, 2, \ldots, N; 1 - 1, 2.$$

where $\theta = (\theta, \dot{\theta})$. The error signal of neurons in the third layer 13, 23, 33 is the same as that of the 4th layer 14, 24, 34. The error signals of neurons in the 1st and 2nd layers 11, 21, 31 and 22, 22, 32 are computed from those in the 3rd layer as in the usual back-propagation learning rule:

$$\delta^i = \phi'(u_{m,j}^i) \sum_k w_{i,k}^{m,m+1} \delta_{m+1,j}^k \tag{11}$$

After the incremental changes of synaptic weights are calculated independently in every network unit, all changes for the corresponding synaptic weight are summed to be the net change. This procedure guarantees identity of all network units.

In the pattern-generating phase shown in FIG. 2, electrical couplings between neurons representing torques in the 1st layer 11, 21, 31 of the neighboring units are activated while torque inputs to the 1st layer 11, 21, 31 and the teaching signal to the 4th layer 14, 24, 34 are suppressed. Instead, the central commands which specify the desired end point, the desired via-point and the locations of obstacles to be avoided are given to the 4th layer 34 from the higher motor center 5 which receives the necessary information for the trajectory specification. Locations of the end point, the intermediate point and the obstacle are given to the fourth-layer of the network units.

The error signals for all neurons are calculated from the equation (10) exactly the same as in the learning phase, while replacing the realized trajectory as the teaching signal by the desired end point, the via-point, obstacles and so on, as the objective signal. If we consider the simple case without via-point or obstacles, the backward propagation of errors in the pattern generating phase obeys the following equation:

$$j = 1, 2 \ldots, N-1; i = 1,2 \tag{12}$$

where $\theta_{d,N} = (\theta_{d,N}, \dot{\theta}_{d,N})$ represents desired terminal conditions. The error signals are not used for synaptic modification. However, the error signals to the torque neurons in the first layer 11, 21, 31 are used for dynamical state change of the model. That is, the network changes its state autonomously by forward synaptic calculation and by back-propagation of error signals through the cascade structure while obeying the following differential equation.

$$T \cdot d\tau_j/ds = \delta_{1,j}^3 + g(\tau_{j+1} - 2\tau_j + \tau_{j-1}) j = 0, 1, 2, \ldots, N-1 \tag{13}$$

where s is the time of neuron state change and has nothing to do with the movement time t. g denotes the electrical conductance of the gap junction. We note that calculation of the error signal $\delta_{i,j}^3$ at every instant s in the equation (13) requires both the forward calculation of every neuron state through the entire network with learned synaptic weights, and the backward propagation of the error signal by the equation (12) through the entire network.

It can be shown that the network dynamics has the following Ljapunov function or "energy".

$$L = \frac{1}{2}\{\theta_d(N\Delta t) - \theta(N\Delta t)\}^2 + \tag{14}$$

$$\frac{1}{2}\{\dot{\theta}_d(N\Delta t)\}^2 - \dot{\theta}_d(N\Delta t)\}^2 + \frac{1}{2} \cdot g \sum_{j=0}^{N} (\tau_j - \tau_{j-1})^2$$

Here we show the Ljapunov function in a simple case without the via-point or the obstacle avoidance conditions. The first two terms of the Ljapunov function require that the hand reaches the end point with a specific speed and the third term guarantees the minimum torque change criterion. The stable equilibrium point of the network dynamics corresponds to the minimum-energy state, and, hence, the network outputs the torque, which realizes the minimum torque trajectory. An appropriate delay line should be inserted between the cascade network and the controlled object in FIG. 2. The conductance g is slowly decreased to 0, during relaxation of the state point to the equilibrium, similar to the temperature in "simulated annealing" (Kirkpatrick, Gellat, Vecci, 1983).

The first two terms of the Ljapunov function are the hard constraints imposed by trajectory specification, and the third term is the smoothness constraint. Introduction of the third energy as electrical couplings resolves the ill-posed trajectory formation. The network learns the first two terms of the energy as synaptic weights, and then minimizes the total energy.

Mathematically, the relaxation computation of the cascade network has a close relationship with the first-order gradient method which is a well known numerical method in optimal control theory (Bryson and Ho, 1975). As mentioned above, the forward calculation through the cascade structure using the equations (3) and (4) is interpreted as forward numerical integration of a control system equations. Similarly, the backward propagation of error is interpreted as backward integration of a part of an adjoint equation of the dynamics equation. The equation (12) can be interpreted as backward Euler's numerical integration of a part of the adjoint equation. The proposed network is different from the control theory approach in that it does not utilize any co-state (in this case $\dot{\tau}$). Because of this, (i) the modification algorithm of the motor command is different, (ii) the neural network model uses fewer state variables, (iii) and it is several times faster. The most marked advantage of the neural network model is that we can impose constraints on the motor command by directly constraining states of the neurons which represent the motor command. Instead, if we use the co-state, these constraints must be treated as those on the state variables, which leads to further complication of the calculations. This is important, since when we extend the minimum torque-change model to the minimum muscle tension-change model, we must introduce positivity constraints on muscle tensions. Actually, in this case, if we use a standard sigmoid input-output transformation function for neurons representing motor commands, we do not need to introduce any extra constraint for positivity of muscle tension at all.

Figure 3:
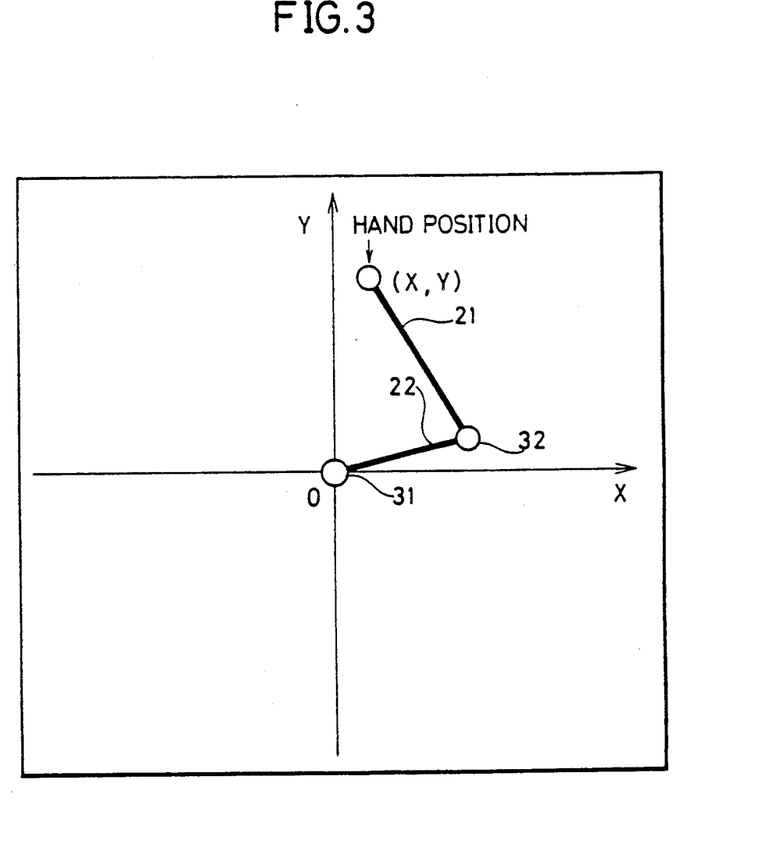
FIG. 3 is a diagram for explaining a 2-link robot manipulator used for testing the embodiment of the invention in computer simulation experiments.
Figure 4A:
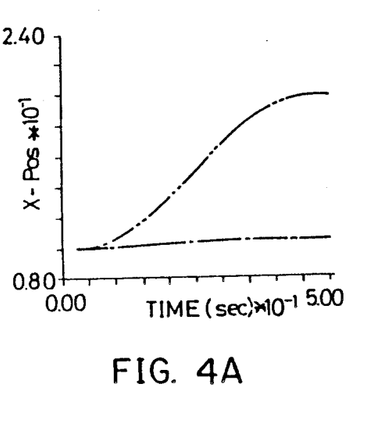
FIGS. 4 and 5 show circuit simulation results in relaxation calculation with respect to trajectory generation by using a neural network model. Particularly.
Figure 4B:
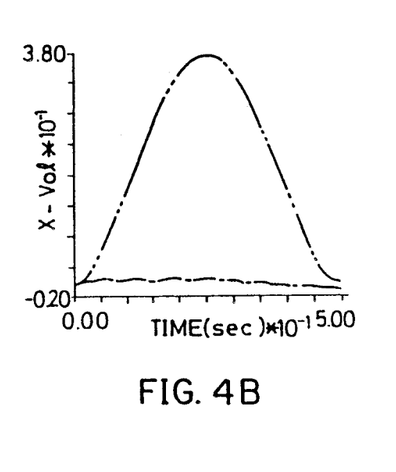
Figure 4C:
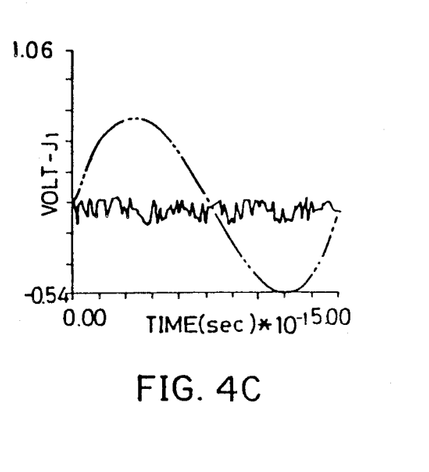
Figure 4D:
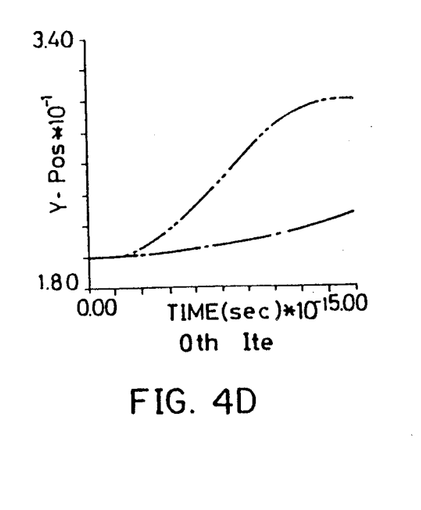
Figure 4E:
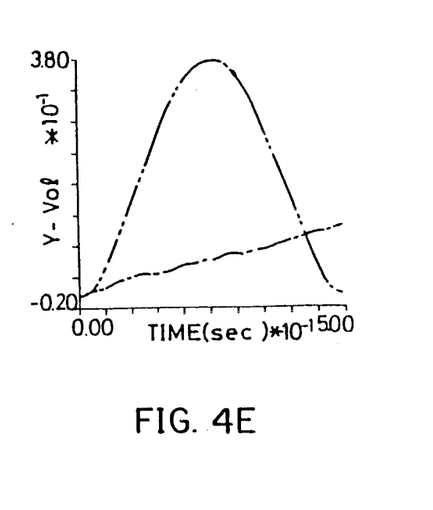
Figure 4F:
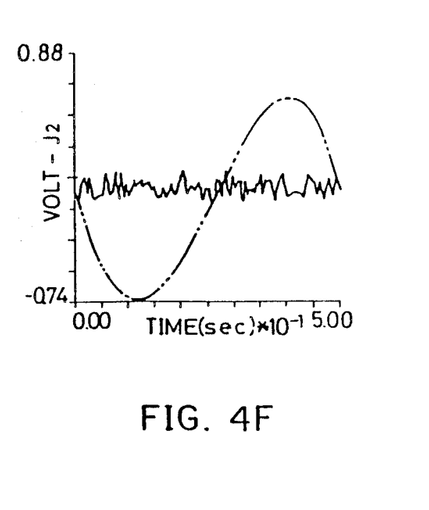
Figure 5A:
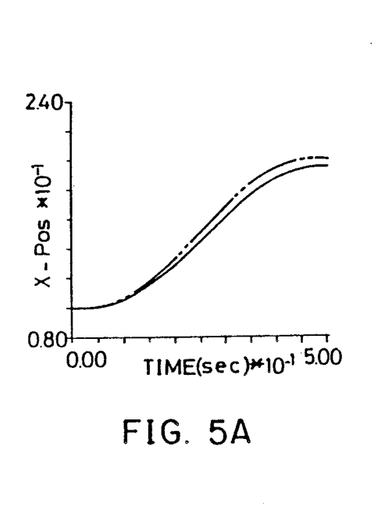
Figure 5B:
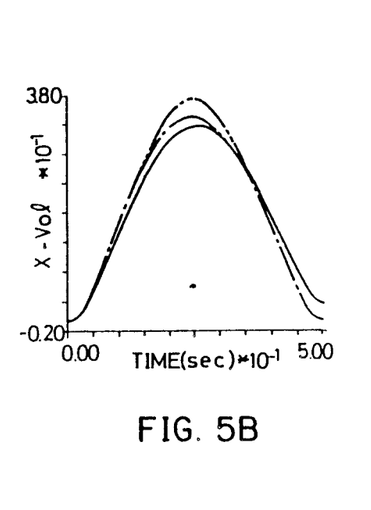
Figure 5C:
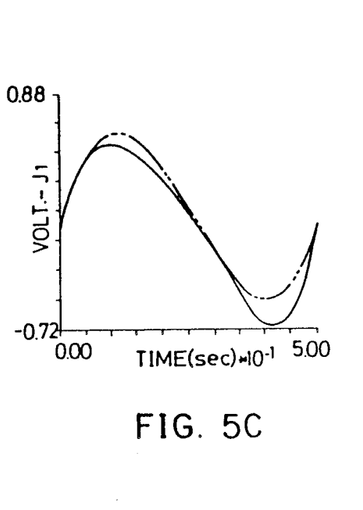
Figure 5D:
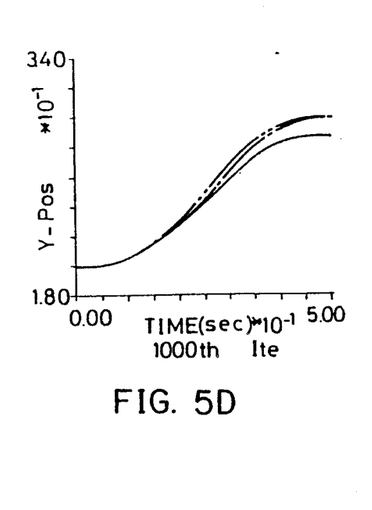
Figure 5E:
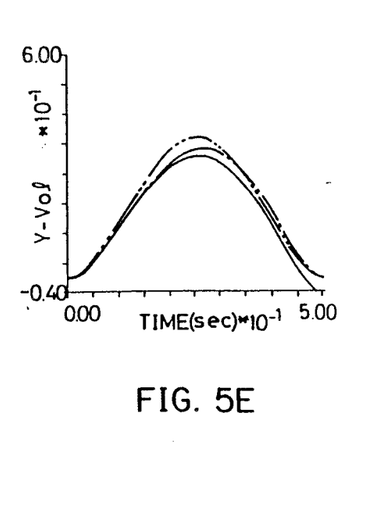
Figure 5F:
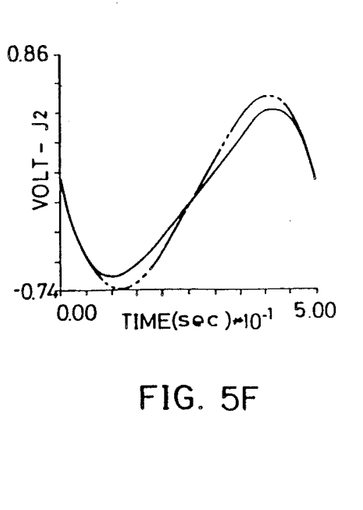

FIG. 3 is a diagram showing a two-joint robotic manipulator within a horizontal plane as a model of a human arm.

The performance of the network model proposed in FIGS. 1 and 2 was examined in computer simulation experiments of trajectory formation. A two-link robotic manipulator shown in FIG. 3 was used as model of a human right arm. Links 21 and 22 correspond to the upper arm and the forearm, and joints 31 and 32 correspond to the shoulder and the elbow. The joint 31 (shoulder) is located at the origin of the X-Y cartesian coordinates. The positive direction of the X coordinate is the right side direction of the body, and the positive direction of the Y coordinate is the front direction of the body. Physical parameters of the model manipulator are shown in Table 1. They were chosen based on experiment data and human arm geometry (see Uno et al, 1989). The hand position is represented as (X, Y) in meter.

TABLE 1

| Parameter | Upper arm | Forearm |
|---|---|---|
| $L_k$ (m) | 0.25 | 0.35 |
| $S_k$ (m) | 0.11 | 0.15 |
| $M_k$ (kg) | 0.9 | 1.1 |
| $I_k$ (kgm$^2$) | 0.065 | 0.100 |
| $B_k$ (kgm$^2$/s) | 0.07 | 0.07 |

Because the manipulator has two degrees of freedom within the plane, there is no redundancy at the kinematics level. Because the manipulator has only one actuator at each joint, there is no redundancy at the dynamics level. Consequently, in this simplest case, the forward kinematics and dynamics of the manipulator can be described by the following ordinary differential equations expressed in task-oriented coordinates.

$$dX/dt = \dot{X}$$

$$dY/dt = \dot{Y}$$

$$d\dot{X}/dt = p(X, Y, \dot{X}, \dot{Y}, \tau^1, \tau^2)$$

$$d\dot{Y}/dt = q(X, Y, \dot{X}, \dot{Y}, \tau^1, \tau^2) \quad (15)$$

where $\tau^1(t)$ and $\tau^2(t)$ represent torque waveforms fed to the shoulder and the elbow. p and q are nonlinear functions which determine the nonlinear dynamics and kinematics of the manipulator.

Correspondingly, we chose the simple cascade neural network model shown in FIG. 1 as a composite model of the forward dynamics and kinematics of the controlled object and conducted simulation with the following conditions. The right side of the equation (15) is acquired in a three-layer network unit. The first layer of each network unit contains 6 neurons. 4 of them represent the task space trajectory X, Y, $\dot{X}$, $\dot{Y}$, and the other 2 represent torque waveforms $\tau^1$, $\tau^2$. The third layer of each network unit contains 4 neurons which represent changes of the task space trajectory within a unit of time (i.e. the right sides of the equation (15) multiplied by $\Delta t$). The fourth layer of each network unit contains 4 neurons, and they represent the task space trajectory X, Y, $\dot{X}$, $\dot{Y}$. There are 20 hidden neurons in the second layer of each network unit. Hence, there are 34 neurons in each network unit. 200 synaptic weights need to be learned to acquire combination of forward dynamics and kinematics.

The movement time was set at 500 ms. 5 ms was chosen for the time step $\Delta t$ of the network. Thus, we prepared 100 network units. The total neural network model contains 3,400 neurons and 20,000 modifiable synaptic weights. However, only 200 synaptic weights are independent parameters to be acquired since each network unit is identical.

Two different learning schemes are possible to train the cascade network as the forward model. The first scheme uses back-propagation of trajectory errors all through the cascade structure. The second scheme is simpler than this. We detach each network unit from the cascade structure. The jth network unit receives the realized trajectory and the motor command at $(j-1)\Delta t$ as inputs, and receives the realized trajectory at $j\Delta t$ as a desired output or the teaching signal. Consequently, each network unit is trained to acquire only the vector field multiplied by $\Delta t$, and no back-propagation of trajectory errors is conducted.

Learning of the forward dynamics and kinematics model was conducted utilizing both schemes with 40 training trajectories whose durations were all 500 ms. The starting point at the end point of the training trajectory were located within a circle with a center (0.2, 0.2) and a radius 0.15. Each trajectory contains 100 sampling points. Therefore, the training set consists of 4,000 data. This is sufficiently large compared with the 200 independent synaptic weights, so we expect that the network generalizes well after sufficient learning. First, the training set was given to the network 1,000 times utilizing the second learning scheme. Next, the same training set was again given 1,000 times with the first learning method. The estimated trajectories by the network were almost identical to the teaching trajectories after learning. The network estimated fairly good trajectory even for an inexperienced torque input. Then we used the trained network for arm trajectory formation.

Trajectory between two points

First, trajectory formation between two points was examined. The objective is to move the arm between the starting point (0.1, 0.2) and the end point of (0.2, 0.3) in 500 ms based on the minimum torque-change criterion.

FIGS. 4 and 5 show relaxation of the neural network state during generation of a movement between two points. Particularly, FIG. 4 shows the initial condition of the neural network model and FIG. 5 shows the stable equilibrium state of the network after 1,000 iterations and the corresponding realized trajectory by the model manipulator. The abscissa of all the figures show the time in seconds. The left column shows the hand position trajectory X(t) (above) and Y(t) (below). The scale of the ordinate is in meters. The middle column shows the hand velocity history $\dot{X}$(t) (above) and $\dot{Y}$(t) (below). The scale of the ordinate is in meters per second. The right column shows the torque waveforms fed to the shoulder (above) and to the elbow (below). The scale of the ordinate is in volts. Two-point chain curves are exact trajectories and torque waveforms of the minimum torque-change model calculated by a Newton-like method. One-point chain curves in the left and middle columns are trajectories estimated by the network model. Solid curves in the right column represent torque waveforms generated by the network model. Solid curves in the left and middle columns in FIG. 5 show the realized trajectory by the model manipulator when the generated torque is fed to it.

The states of 200 torque neurons were set at random initial values at the beginning of relaxation. After 1,000 iterations of relaxation computation according to the equation (13), the state settles down to a stable equilibrium and generates an estimated trajectory and a torque shown in FIG. 5. Solid curves in FIG. 5 show a trajectory realized by the model manipulator when fed the torque estimated by the network. The estimated trajectory reaches the end point at the given time and stopped properly. The generated torque waveforms were smooth enough and fairly close to the exact solution.

The realized trajectory did not reach the end point. There are consistent errors between the minimum torque-change trajectory (two-point chain curve), the estimated trajectory (one-point chain curve) and the realized trajectory (solid curve). We know that the cause of this error is incomplete running of dynamics and kinematics, since the error is almost negligible in the simulation experiments where an accurate forward model is used. Thus, we expect that the network can generate a more accurate trajectory and torque if we use more efficient running algorithms such as the conjugate gradient method or the quasi-Newton method instead of the back-propagation (steepest descent) algorithm, and if we carefully select more independent training data.

Figure 6:
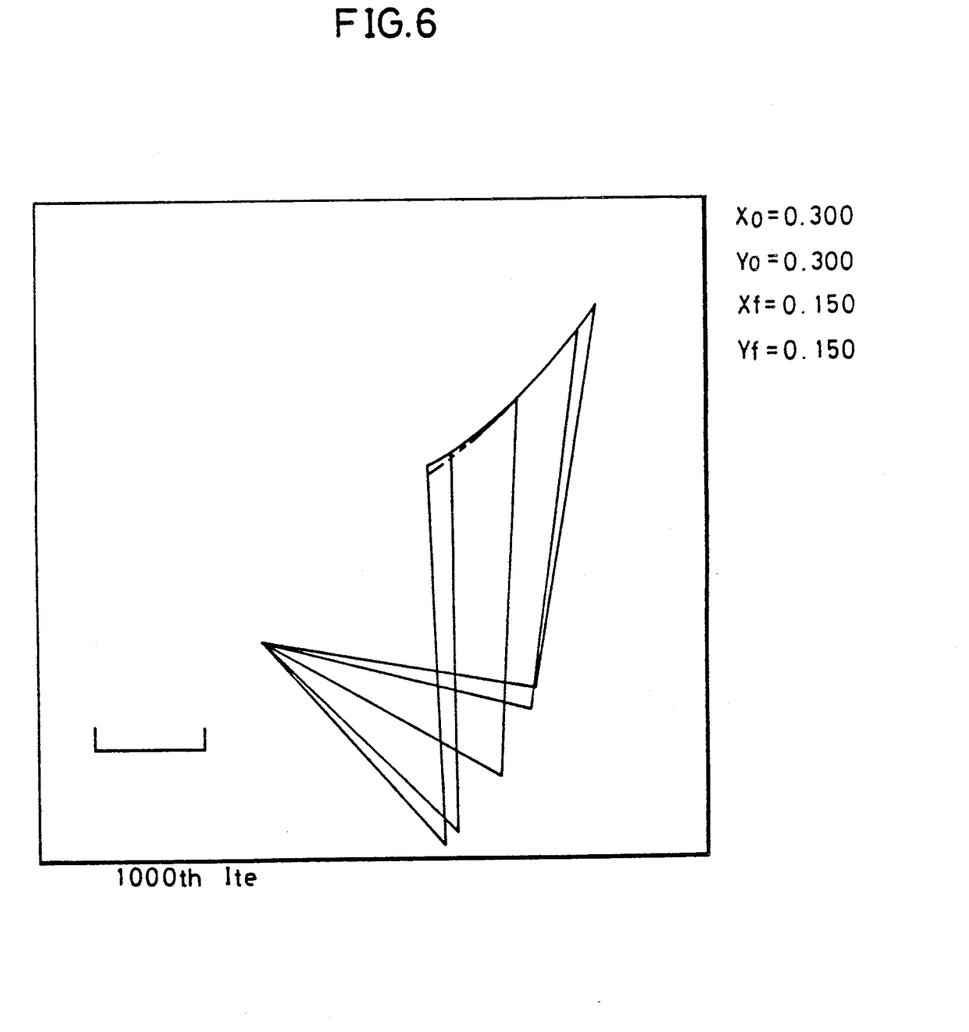
FIG. 6 is a bird's eye view of a hand path between the start point (0.3, 0.3) and the end point (0.15, 0.15).

FIG. 6 is a bird's-eye view of a hand path between two points and 5 configurations of the model manipulator every 125 ms. The scale in the figure is 0.1 m. The solid curve is the realized hand path, and the two-point chain curve is the exact minimum torque-change hand path calculated by a Newton-like method. The number of relaxation computation iterations was 1,000.

The minimum torque-change hand path and the realized hand path are shown by the two-point chain curve and the solid curve, respectively. At this solution, the minimum-torque change hand path and the one estimated by the neural network model cannot be separately seen. The error between the realized hand path and the minimum torque-change hand path was due to the incomplete running of the forward model.

Obstacle avoidance trajectory

Figure 7:
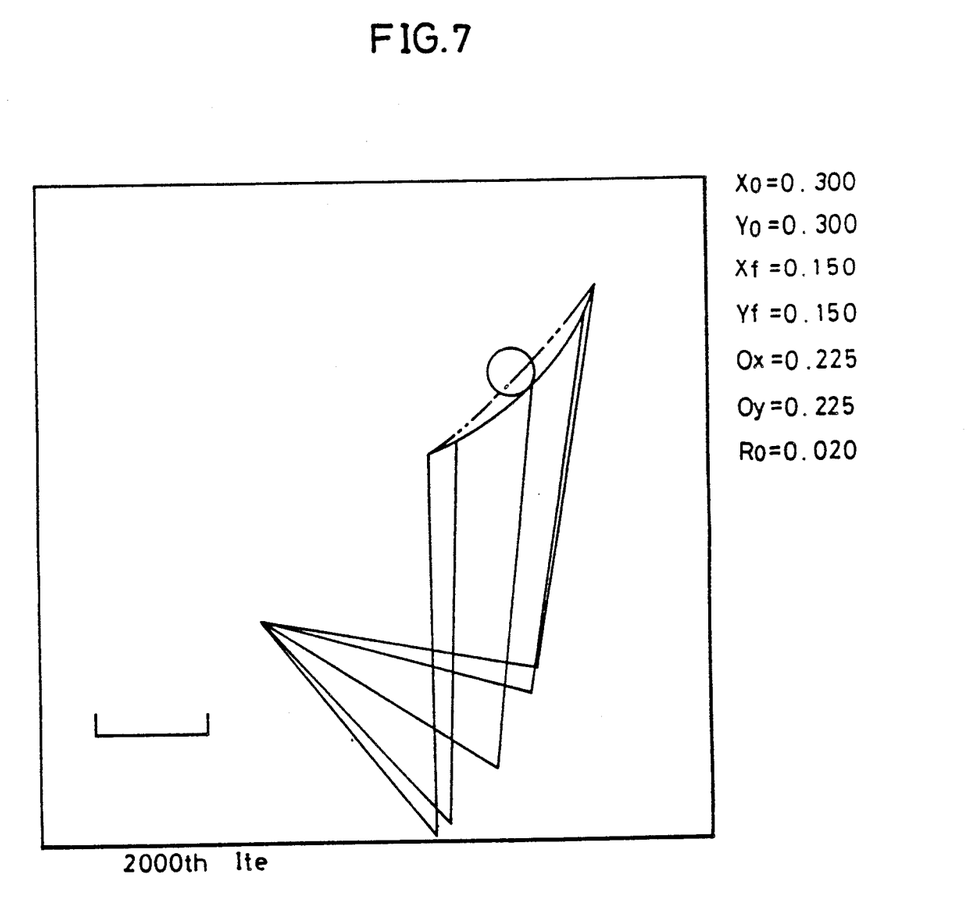
FIG. 7 is a diagram showing results of simulation of trajectory generation by a network model while avoiding obstacles.
Figure 8A:
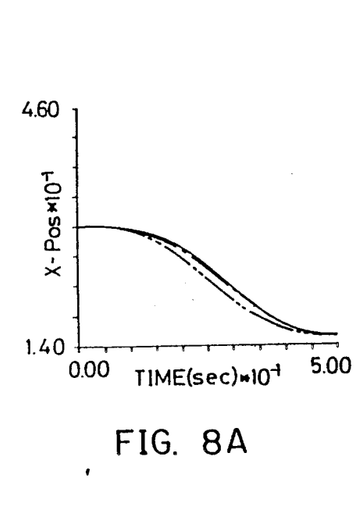
FIG. 8 is a diagram showing corresponding trajectories and torque waveforms.
Figure 8B:
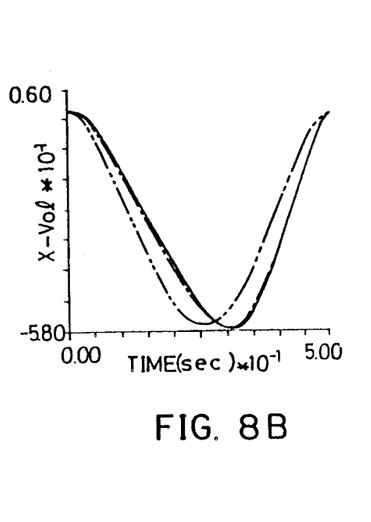
Figure 8C:
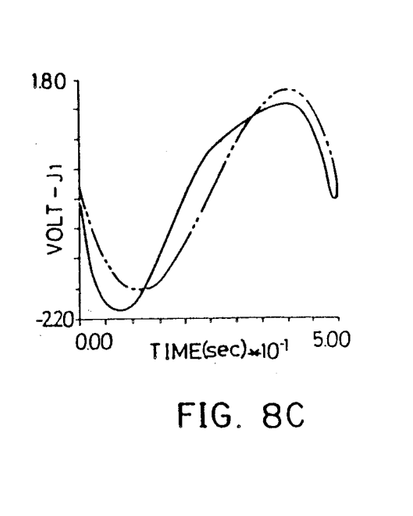
Figure 8D:
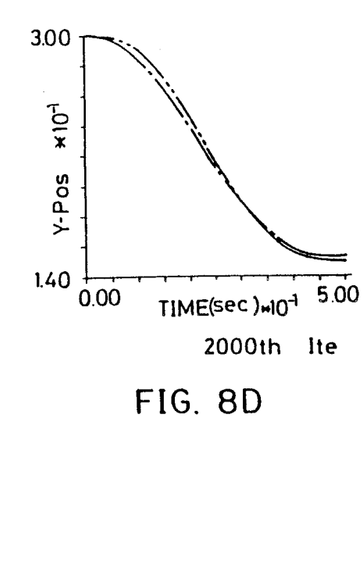
Figure 8E:
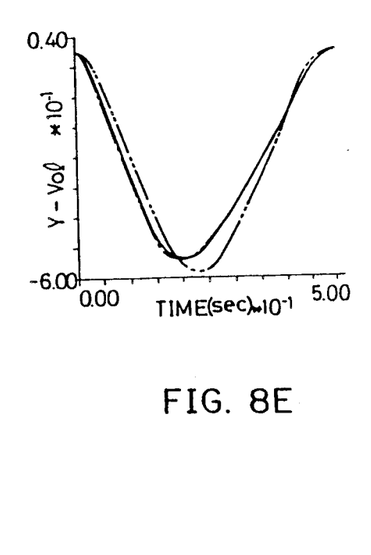
Figure 8F:
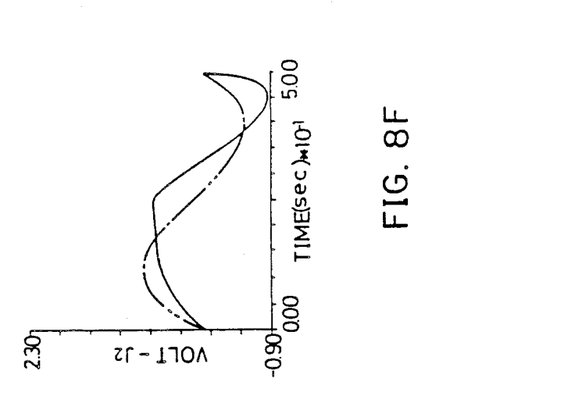

FIG. 8 shows trajectories and torque waveforms corresponding to FIG. 7. The two-point chain curves in FIGS. 7 and 8 show hand paths, trajectories and torque waveforms for the minimum torque-change trajectory without the obstacle. One can see considerable deformation of the torque waveforms because of avoidance of even the small obstacle. The number of relaxation computation iterations was 2,000 in this experiment.

First, a simple case with one obstacle which is a circle with center $(C_X, C_Y) = (0.225, 0.225)$ and a radius $R = 0.02$ m was examined. The start point and the end point were (0.3, 0.3) and (0.15, 0.15), which are the same as in FIG. 6.

Let $(X_j, X_y)$ denote the hand position at the jth time which is estimated by the neural network model. $r_j$ represents a distance between the center of the circle and the estimated hand position at the jth time. The non-negative obstacle avoidance function was chosen as follows:

$$H(X_j, Y_j, \Omega) = (r_j - R)^2/2 \ (r_j < R) \quad (16)$$
$$= 0 \ (r_j \geq R).$$

With this obstacle avoidance potential, the corresponding obstacle avoidance error signals for the first and the second neurons in the fourth layer of the jth network unit can be calculated as follows:

$$\delta^1_{4,j} = -h(r_j)(C_x - X_j) \quad (17)$$

$$\delta^2_{4,j} = -h(r_j)(C_y - Y_j) \quad (18)$$

$$h(r_j) = (R - r_j)r_j^{-1} \ (r_j < R) \quad (19)$$
$$= 0 \ (r_j \geq R).$$

Note that the sign of the error signal is opposite that of the usual error signals associated with the desired end or via-points, since h is positive. Thus, the center of the obstacle acts like a repelling point when the hand position is within a circle. If the hand is located outside the obstacle, the obstacle does not exert any force on the arm at all.

Figure 9:
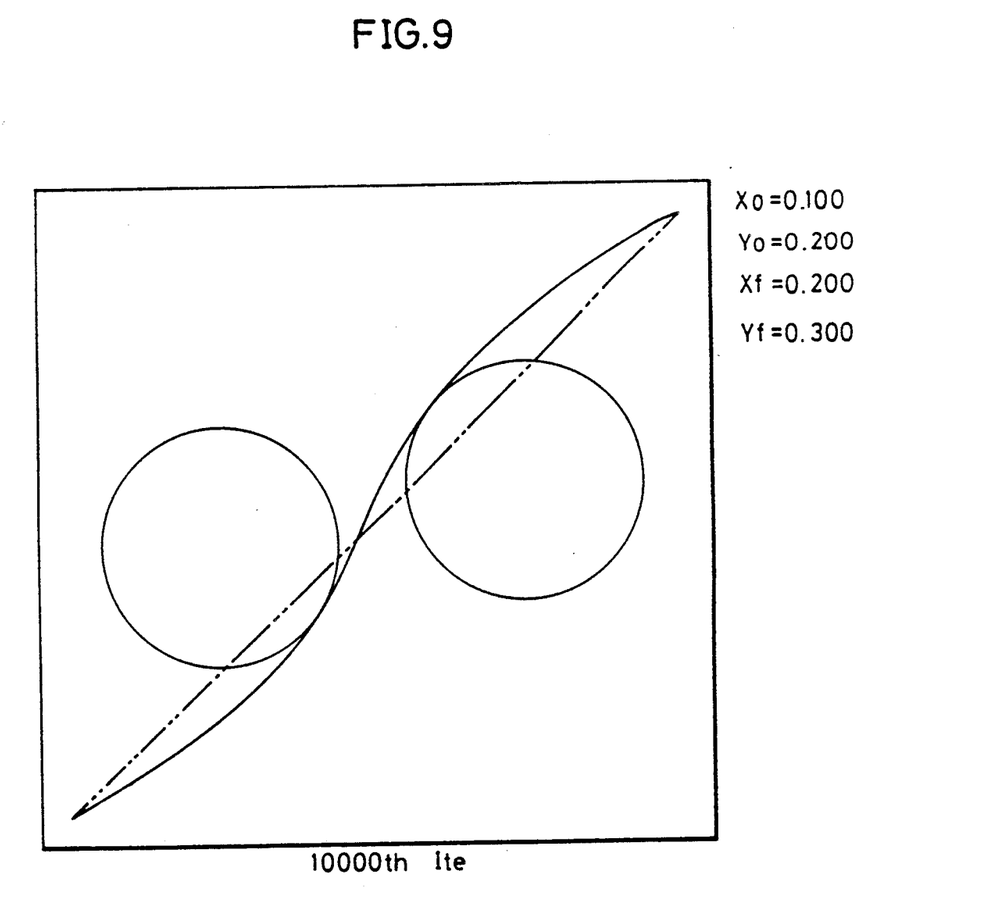
FIG. 9 is a bird's eye view of a hand path avoiding two obstacles.

FIG. 9 is a bird's-eye view of a hand path which avoids two obstacles. A two-point chain curve shows the exact minimum torque-change hand path calculated by a Newton-like method when there is no obstacle The starting point is (0.1, 0.2), and the end point is (0.2, 0.3). Centers of the two circle obstacles with a radius 0.02 m are (0.125, 0.245) and (0.175, 0.255). In this simulation, we used the exact equation shown in the equation (15) for forward calculation in the relaxation computation instead of using the network unit. Similarly, we used the transforce of the Jacobian of the right hand sides of the equation (15) with respect to X, Y, $\dot{X}$, $\dot{Y}$, $\tau^1$, $\tau^2$ during backward calculation of error signals instead of the usual back-propagation of the neural network model. Because we used the exact forward dynamics and kinematics model, the estimated trajectory and the realized trajectory coincided almost perfectly. We note that the realized and estimated trajectories came in contact with the two obstacles because of the minimum torque-change criterion.

Referring to FIG. 9, a one-point chain curve shows a hand path estimated by the network model. A solid curve shows a realized trajectory by the manipulator when the generated torque is fed to it. Because we used an accurate model of the forward dynamics in this simulation, these two curves almost coincided and cannot be seen separately at this solution. The number of relaxation computation iterations was 10,000 in this experiment.

Because we imposed the obstacle avoidance potential only to the hand position, the links of the manipulator collided with the right obstacle in this case. We can extend the present model so that neither the links nor the hand collide with obstacles, as follows: First, we need to train a neural network model which estimates link locations from the hand position or from the joint angles. In the pattern generating phase, this extra forward kinematics model is attached to the output lines of the original cascade network. The error signals for obstacle avoidance are first calculated at the output side of this extra network, then they are back-propagated through it, and subsequently through the cascade network as before.

We note that the neural network model has multiple stable equilibrium in relaxation computation for avoidance of multiple obstacles. Depending on the initial conditions, the network settled down to three different trajectories. The first is shown in FIG. 9. The second trajectory runs above the two obstacles, and the third one runs below. The forward dynamics and kinematics of the arm is nonlinear. The obstacle avoidance potential field is not convex. Consequently, the total energy of the network is not convex, and the steepest descent method employed in this paper may be trapped to local minimum, as exemplified in this example. We do not think of this local minimum problem as a deficiency of our model. This kind of local minimum behavior is frequently seen in humans. Furthermore, we can avoid local minimum by adding noise to the relaxation equation as in the simulated annealing. However, we do not think this is necessary.

Via-point trajectory

Figure 10:
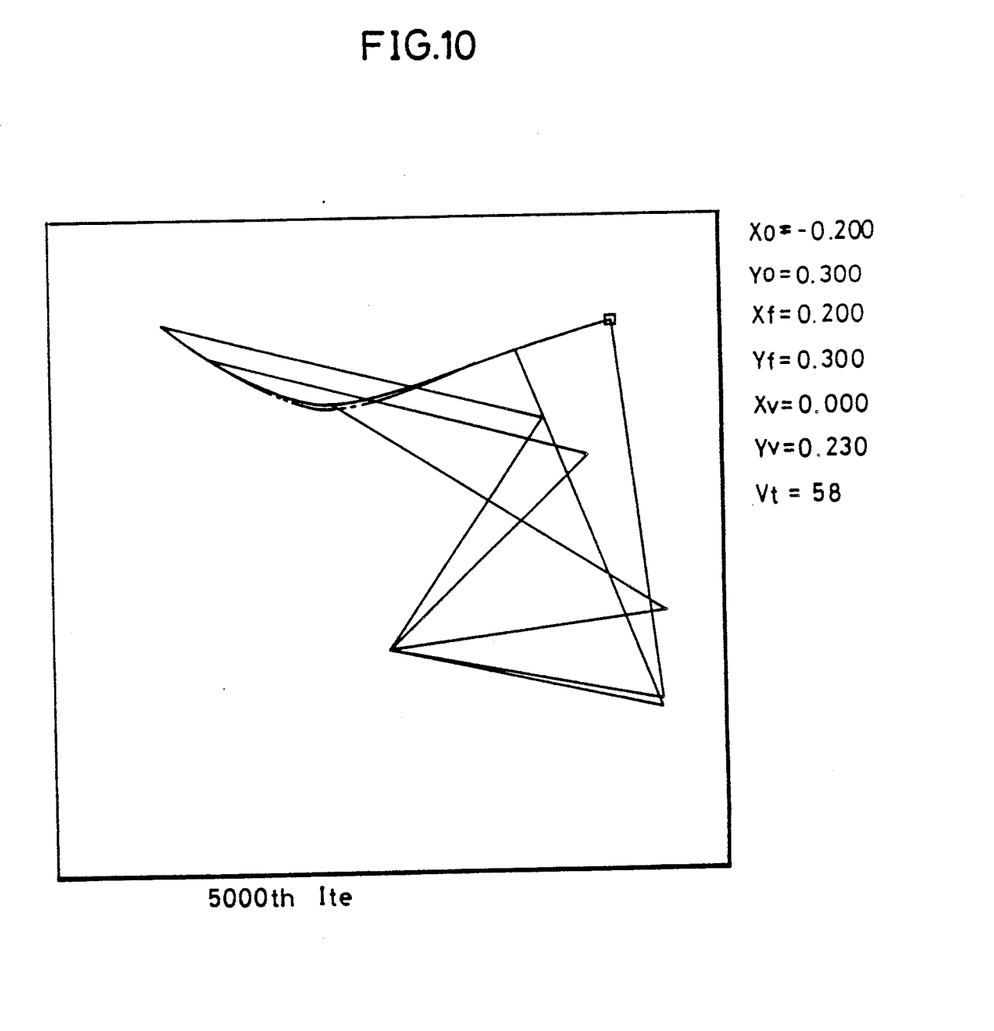
FIG. 10 is a diagram showing hand paths and arm configurations for a via-point movement.
Figure 11A:
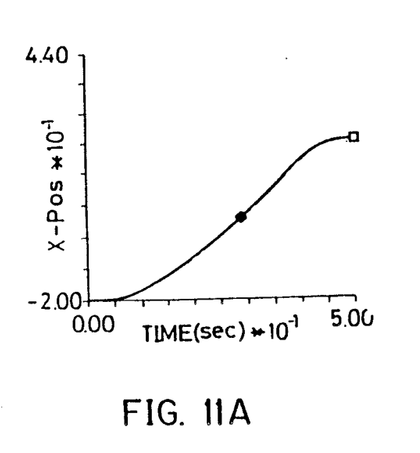
FIG. 11 shows diagrams showing trajectories and torque waveforms.
Figure 11B:
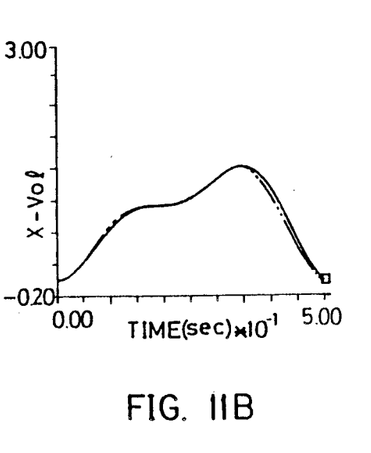
Figure 11C:
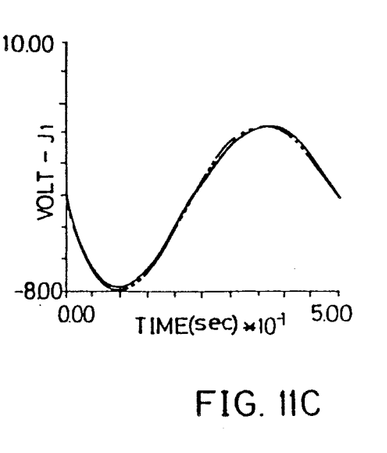
Figure 11D:
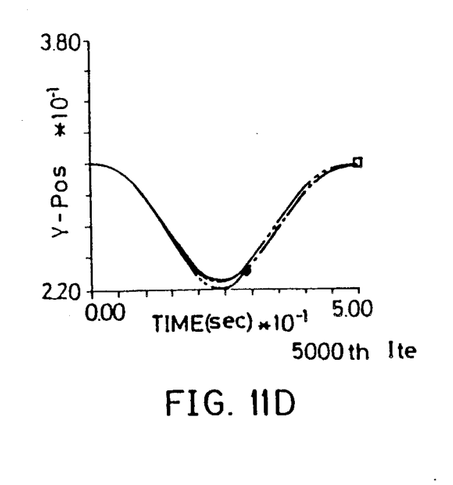
Figure 11E:
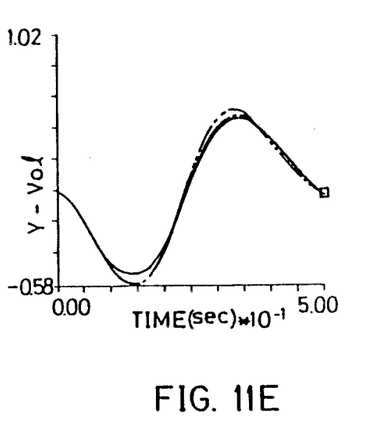
Figure 11F:
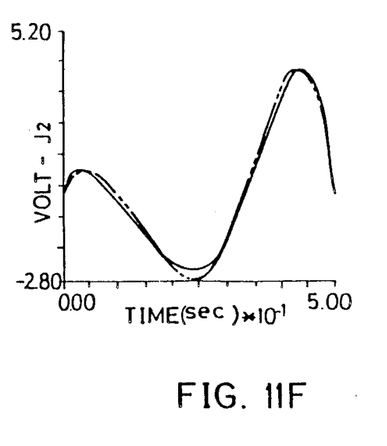

FIG. 10 shows hand path and arm configuration for a via-point movement, and FIG. 10 shows trajectories and torque waveforms for the via-point movement. FIG. 10 is the same format as FIG. 6. FIG. 11 is the same format as FIG. 5. The parallelogram in FIG. 10 shows the location of the via-point. Parallelograms in the left column of FIG. 11 show the corresponding X and Y coordinates of the via-point. The number of relaxation computation iterations was 5,000 in this experiment.

The neural network generated a via-point trajectory which passes through the via-point (0, 0.23) from the start point (−0.2, 0.3) to the end point (0.2, 0.3). We used exact equations in forward and backward calculations instead of using the network unit. In this simulation, we did not specify the time when the via-point must be pass. The neural network model autonomously finds the best time to pass the via-point on the minimum torque change criterian using the energy equationor. The estimated and realized trajectories were in fairly close agreement with the trajectory calculated by the Newton-like method. In particular, between these two methods, the time required to pass the via-point differed by only 0.005 s.

As described in the foregoing, according to the embodiment of the present invention, the model is provided with the cascade connection structure for the learning of each unit layer circuit and the flow of the differential equations, and the electronic synapses for ensuring smoothness of movement and bypasses. Thus, because of the energy minimization capability of the ultra multilayer structure network model, the computation time increases only in linear order of degrees of freedom of the controlled object. In addition, the method according to the embodiment of the invention makes it possible to automatically generate a trajectory with high precision and to control objects in a wide range of applications. Thus, it can be expected to make trajectory learning and generating systems in general have improvements in performance that a trajectory can be automatically generated smoothly as in movement of a human without causing any excessive load to the controlled object.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for generating a time trajectory of a controlled object comprising the steps of:
    generating said time trajectory of said controlled object in a network by using conditions for estimating the movement trajectory comprising at least one of a movement time, a start point, an end point and a via-point of the trajectory, and obstacles to the movement; and
    using a criterion for ensuring smoothness of the movement trajectory by minimizing evaluation functions in integration for a movement time obtained by square of a function of movement comprising at least one of the third derivative of position with respect to time, time change of torque, and time change of force.

2. A method for generating a time trajectory of a controlled object comprising the steps of:
    generating said time trajectory of said controlled object in a network by using conditions for estimating the movement trajectory comprising at least one of a movement time, a start point, an end point and a via-point of the trajectory, and obstacles to the movement;
    using a criterion for ensuring smoothness of the movement trajectory by minimizing evaluation functions in integration for a movement time obtained by square of a function of movement comprising at least one of the third derivative of position with respect to time, time change of torque, and time change of force;
    obtaining in the network a number of internal models by multiplying by a unit of time a vector field of nonlinear differential equations describing dynamic characteristics of said controlled object; and
    generating the time trajectory of said controlled object by using bypasses corresponding to a flow of differential equations and discrete diffusion couplings for satisfying the evaluation criterion for ensuring the smoothness of movement.

3. A trajectory generating method in accordance with claim 2, further comprising:
    using a multilayer neural network for learning internal models obtained by multiplying, by the unit of time, the vector field of said nonlinear differential equations, wherein a large number of said multilayer neural networks are cascade-connected, and
    generating said time trajectory of said controlled object by using bypasses corresponding to a flow of the differential equations and electric synapses for satisfying the evaluation criterion for ensuring the smoothness of movement.

4. A movement trajectory generating method of a dynamical system, for generating a time trajectory of a controlled object,
    a number of cascade-connected multilayer neural networks being included, said method comprising
    learning forward dynamics and kinematics of said controlled object by using said multilayer neural networks, and
    providing conditions concerning trajectory of a final point and a via-point of movement of said controlled object, and locations of obstacles, generating the trajectory and obtaining a control input for realizing the trajectory simultaneously by least dissipation of energy while ensuring smoothness of movement by electric synaptic couplings using errors with respect to said conditions as total energy.

5. A method for generating a time trajectory for a controlled object, using a control network, the method comprising the steps of:
    inputting condition data;
    estimating a movement trajectory of the controlled object based on the condition data;
    generating a function of the movement of the controlled object;
    squaring the function of movement;

integrating the squared function of movement to derive an evaluation function; and minimizing the derived evaluation function to smooth the estimated movement trajectory.

6. A method for generating a time trajectory as in claim 5 wherein the input condition data relates to movement time, start point, end point, a via-point of the trajectory or obstacles to movement.

7. A method for generating a time trajectory as in claim 5 further comprising the steps of:
   detecting the position of the controlled object as a function of time;
   generating a third derivative of the position signal; and
   using the third derivative of the position signal as said function of movement.

8. A method for generating a time trajectory as in claim 5 further comprising the steps of:
   detecting change in the torque per unit time; and
   using the change in torque per unit time as said function of movement.

9. A method for generating a time trajectory as in claim 5 further comprising the steps of:
   detecting change in force; and
   using the change in force as the function of movement.

10. A method for generating a time trajectory as in claim 5 further comprising the step of using a neural network as the control network to generate the time trajectory.

11. A method for generating a time trajectory as in claim 5 performed in a cascade connected multilayer neural network wherein the estimating, generating and smoothing steps are performed in a cascade connected multilayered neural network.

12. A method for generating a time trajectory as in claim 5 further comprising the step of using the smoothed estimated trajectory to control movement of the controlled object.

* * * * *